S. E. TUTTLE.
Improvement in Atmospheric Engines.

No. 124,520. Patented March 12, 1872.

Witnesses:
Gustave Dieterich
Geo. W. Mabee

Inventor:
Silas E. Tuttle
per
Attorneys.

124,520

UNITED STATES PATENT OFFICE.

SILAS E. TUTTLE, OF EVANSVILLE, WISCONSIN.

IMPROVEMENT IN ATMOSPHERIC ENGINES.

Specification forming part of Letters Patent No. 124,520, dated March 12, 1872.

Specification describing a new and Improved Atmospheric Engine, invented by SILAS E. TUTTLE, of Evansville, in the county of Rock and State of Wisconsin.

Figure 1:
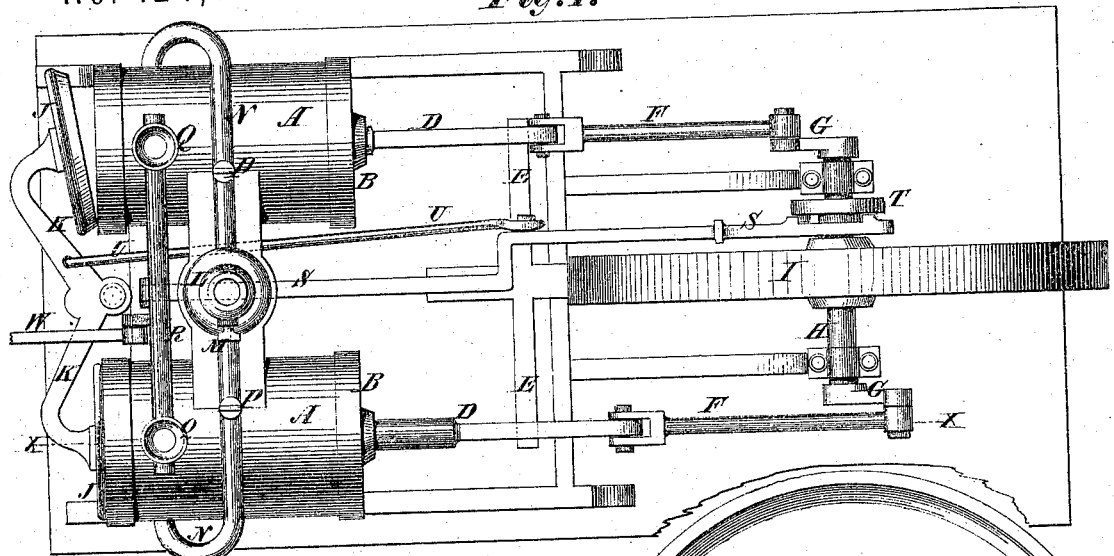
Figure 2:
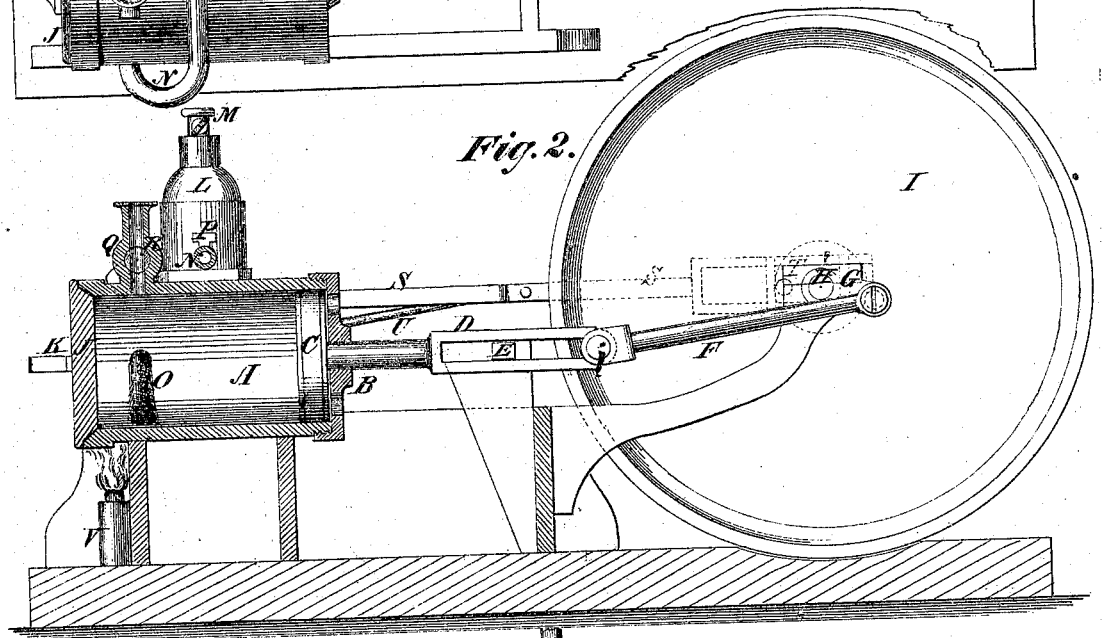
Figure 3:
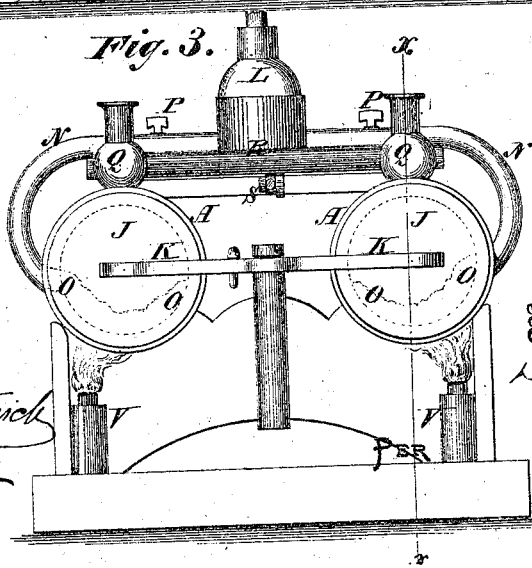

Figure 1 is a top view of my improved atmospheric engine. Fig. 2 is a side view of the same, partly in section, through the line $x\ x$, Fig. 1. Fig. 3 is a front view of the same.

Similar letters of reference indicate corresponding parts.

My invention has for its object to furnish a simple, convenient, and effective atmospheric engine, which shall be so constructed that a vacuum may be formed in the cylinder by burning the oxygen of the air, causing the piston to be forced forward into said vacuum to make its stroke by atmospheric pressure on the other side of said piston; and it consists in the construction and combination of the various parts of the engine, as hereinafter more fully described.

A are two cylinders, open at one end and with numerous holes in the heads B at the other ends to allow the air to pass through freely. C are the pistons, which work air-tight in the cylinders A and are attached to the ends of the piston-rods D. The piston-rods D pass out through holes in the center of the heads B and their outer parts are slotted to receive the ends of the cross-bar E, attached to some suitable stationary support, and which is intended to cause the piston-rods to work always in line with the center of the cylinders A. The piston-rods D may be made to move in straight lines by cross-heads attached to them and working in ways or slides in the ordinary manner, if desired, or by any other suitable means. To the outer ends of the piston-rods D are attached the ends of the connecting-rods F, the other ends of which are pivoted to the cranks G attached to the shaft H, to which the fly-wheel I is attached, and from which the power is taken to drive the machinery. The cranks G are arranged parallel with each other, but project upon the opposite sides of said shaft H, so that the pistons C will always be moving in opposite directions. The open ends of the cylinders A are closed air-tight by valves J, which are rigidly attached to the opposite ends of the cross-bar or walking-beam K, which is pivoted at its center to some suitable stationary support. The valves J are so arranged upon the cross-bar K that when one of said valves is opened the other will be closed. L is a reservoir for containing alcohol or some other suitable inflammable substance. The mouth of the reservoir L is closed with a stop-cock, M. N are pipes, one end of each of which is connected with the reservoir L, and their other ends are connected with the cylinders A near their open ends. O are wicks, which pass through the pipes N from the reservoir L to the cylinders A. The pipes N are provided with stop-cocks P to enable the flow of the inflammable substance through the pipes N to be regulated or stopped, as desired. Q are air-pipes, connected with the cylinders A near their open ends, to admit air to said cylinders, and which are opened and closed by valves formed upon the ends of the rods R, and which are so arranged that one will always be opened as the other is closed. To a short arm formed upon or attached to the valve-rod R is pivoted one end of the rod S, which extends back to and is operated by a cam, T, attached to the shaft H. The cross-bar K is operated to open and close the valve J by a rod, U, one end of which is pivoted to said cross-bar K. The other end of the rod U is connected with the rod S by a pin or bolt, which passes through the said rod S and through a short slot in the said rod U, so that the valve R of said cylinders A may be opened to admit air a little before the valve J of that cylinder is opened, thus allowing the valves J to be operated easily. V are lamps, placed just below the open ends of the cylinders A and as close to them as is possible without having the valves J in their movements interfere with said lamps. To the valve-rod R is attached a lever, W, to allow the valves J to be opened by hand in starting the engine. By this construction, as each valve J is opened the flame from the lamp V sets fire to the wick O, which forms a vacuum in the cylinders A as the valves R and J are closed, and the atmospheric pressure forces the piston C forward, which gives motion to the shaft H. The pistons C act alternately, and thus keep up a constant motion in the shaft.

Having thus described my invention, I claim as new, and desire to secure by Letters Patent—

1. The combination of the valves J, pivoted cross-bar K, pistons C, and open-ended cylinders A, as shown and described.

2. The arrangement of the reservoir L, pipes N, and wicks O, with the cylinders A, as shown and described.

3. The combination of cylinders A, pistons C connected with crank-shaft H, valves J, bar K, rods S and U, cam T, reservoir L, pipes N provided with suitable stop-cocks, and the wicks and lamps, arranged as shown and described.

SILAS E. TUTTLE.

Witnesses:
C. M. TUTTLE,
R. WINSTON.